(12) United States Patent
Williams (10) Patent No.: US 7,945,521 B2
(45) Date of Patent: *May 17, 2011

(54) PROCESS AND ARCHITECTURE FOR STRUCTURING FACILITIES REVENUE BOND FINANCINGS

(76) Inventor: Linda Grant Williams, Bedford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,857

(22) Filed: Jul. 21, 2009

(65) Prior Publication Data

US 2010/0023441 A1 Jan. 28, 2010

Related U.S. Application Data

(63) Continuation-in-part of application No. 11/681,166, filed on Mar. 1, 2007, which is a continuation-in-part of application No. PCT/US2006/31358, filed on Aug. 11, 2006, which is a continuation of application No. 11/202,194, filed on Aug. 12, 2005.

(51) Int. Cl.
*G06Q 10/00* (2006.01)
(52) U.S. Cl. .................................. 705/307; 705/313
(58) Field of Classification Search ............... 705/35, 705/36 R, 38–40, 307, 313–315; 707/607
See application file for complete search history.

(56) References Cited

U.S. PATENT DOCUMENTS

| | | | |
|---|---|---|---|
| 6,154,730 A * | 11/2000 | Adams et al. | 705/36 R |
| 2002/0040339 A1* | 4/2002 | Dhar et al. | 705/38 |
| 2002/0156709 A1* | 10/2002 | Andrus et al. | 705/35 |
| 2003/0028479 A1* | 2/2003 | Kirksey | 705/38 |
| 2003/0130865 A1* | 7/2003 | Fitzgibbon et al. | 705/1 |
| 2004/0098329 A1* | 5/2004 | Tilton | 705/36 |
| 2005/0119962 A1* | 6/2005 | Bowen et al. | 705/37 |

OTHER PUBLICATIONS

U.S. CMBS Legal and Structured Finance Criteria, Standard & Poor's Ratings Services, May 2003, Section 4.*
Lisa Sanders' article Denver Sports Arena Opens New Doors by Using Asset Backed Financing, Bond Buyer, May 28, 1998, vol. 324, issue 30402, p. 43.*

* cited by examiner

*Primary Examiner* — Mary Cheung
(74) *Attorney, Agent, or Firm* — Williams Mullen; Timothy J. Bechen (57) ABSTRACT

A process and architecture may be implemented to structure bond financing or refinancing for facilities construction and/or renovation to improve economic and business terms for involved or interested parties, including for education institutions, healthcare companies and/or energy production entities.

21 Claims, 9 Drawing Sheets

INVENTION ARCHITECTURE

FIG. 1
PRIOR ART
GROUND LEASE/LEASE ASSIGNMENT/SUBLEASEBACK ARCHITECTURE

FIG. 4
INVENTION ARCHITECTURE

FIG. 5
PRIOR ART
GROUND LEASE PLUS LOAN STRUCTURE

FIG. 6

FIG. 7
INVENTION ARCHITECTURE

PROCESS AND ARCHITECTURE FOR STRUCTURING FACILITIES REVENUE BOND FINANCINGS

RELATED APPLICATIONS

This application is a Continuation-in-part of U.S. application Ser. No. 11/681,166 filed Mar. 1, 2007 which is a Continuation-in-part of PCT/US06/31358, filed Aug. 11, 2006 which is a Continuation of U.S. Ser. No. 11/202,194, filed Aug. 12, 2005, all entitled "Process And Architecture For Structuring Facilities Revenue Bond Financing."

BACKGROUND OF THE INVENTION

The present invention generally relates to financing structures/architectures associated with municipal bond financing methods that affect ratings and improve the financiability of self-sustaining assets.

Conventionally, in facilities revenue bond financing, bonds issued to finance the construction or renovation of facilities, for energy companies, educational institutions and healthcare companies, have been supported by the entire company and its affiliate's consolidated balance sheet (referred to as Whole Company Bonds or "WCBs"). Some such companies whose lease payment obligations support the payment of principal and interest on the bonds may be unable to timely repay its obligations due to economic problems, sometimes involving a filing of bankruptcy.

SUMMARY OF THE INVENTION

In accordance with at least one embodiment of the invention, a process and architecture may be implemented to initially structure or restructure bond financing for healthcare companies, education institutions and energy companies, for the construction and/or renovation of a specific facility in a manner which can substantially improve the economic and legal terms for the interested parties.

DETAILED DESCRIPTION OF INVENTION

Although various invention embodiments are disclosed herein in the context of financing or refinancing healthcare facilities financed by healthcare companies, it should be understood that the invention may be implemented in connection with the financing or refinancing of healthcare facilities funded by healthcare companies through the issuance of WCBs or financing of any facility for public and/or multiple private user benefit. An example of a further application of the invention is in connection with the construction of airports, schools and universities, energy projects, hospitals and other healthcare facilities, toll roads or maritime port docking facilities for cargo ships and containers affiliated with various cargo lines and cruise ships affiliated with various cruise lines or cargo shipping lines. Invention embodiments may be implemented in connection with the financing or refinancing of all manner of facilities whether formerly or currently, publicly or privately owned, including, but not limited to healthcare facilities, educational institutions, energy projects, airports, railroads, bus depots, maritime ports, and roads. Thus, it should be understood that utility is provided by invention embodiments in any business scenario wherein single or multiple municipally owned or supported facilities are constructed or renovated for use by the public and/or multiple private entities using funds obtained through the issuance of taxable or tax-exempt municipal bond or other evidence of indebtedness.

In accordance with at least one embodiment of the invention, the inventive concept may be implemented to perform municipally sponsored facilities financings to avoid or partially or fully remedy problems associated with declining credit ratings of the large companies intended to benefit from the construction and the facilities. In that particular implementation, the invention applies to so-called "single facilities revenue bond financings", in which the financing for a facility is supported in whole or in part by the consolidated balance sheet of one or more sponsoring large companies and their affiliates. In such an implementation, the process and architecture apply both to new and existing financings, and may be implemented to assist in insulating any financing from a bankruptcy of the benefiting companies as tenants or subtenants.

A key to any such financing or refinancing situations, is that the revenue-producing potential of a facilities improvement, e.g., a new or renovated hospital clinic, energy project or educational facility, should be well recognized. If there is sufficient potential demand for use of such facilities by parties other than the sponsoring company and its affiliates, the demand may provide a better credit than that of the sponsoring company and its affiliates which together initially support repayment of the municipal bonds. In such instances, third party credit, equity support or asset-backed financing techniques may be applied to finance or refinance the facility on an underlying basis that is supported only by the high demand for use of the facility, evidenced by contracts, contingent leases and "waiting lists" and by the credit of a Single Purpose Entity (SPE), which is able to sublet the facility to the large sponsoring company or its affiliates and other users. That SPE would have rights to any present and potential revenues of the facility, e.g., a toll road, maritime port, airport terminal, hospital, energy project or educational facility. Transactions would be structured to provide financing that would be remote, or insulated, from the bankruptcy of the sponsoring company and its affiliates as well as any other subtenants or other users of the facilities.

This new financing process and architecture is applicable to new facilities improvements and also the refinancing of existing facilities improvements, including but not limited to equipment and/or improvements for healthcare facilities, energy projects and educational institutions by way of example. It is also applicable to toll roads, toll bridges, airport terminals and port docking facilities, which are also, in some locations, typically in great demand. The financing process may be applicable to a municipal bond issue, as well as private refunding of all or part of an outstanding municipal bond issuance.

A conventional "ground lease/lease assignment/subleaseback" architecture involves a government owner leasing ground to a healthcare, energy or educational company and such company partially assigning ground lease rights to a separate government agency bond issuer. The government agency bond issuer issues bonds to finance construction of the facilities and subleases the partially assigned-ground lease rights and facilities back to such company in return for sublease rent on terms sufficient to support the creditworthiness of the arrangement and to permit the conclusion that the sub-sublease is a "true lease" for federal bankruptcy purposes. The sublease is keyed to the maturity of the bonds; the ground lease partial assignment is coterminous with the sublease. Additionally, both the sublease and the partial ground lease assignment terminate on prepayment of bonds. As a result, the purported issuer/sublessor has no residual interest in financed facilities that survives retirement of the bonds.

Recently, various bankruptcy court decisions (see United Airlines, Inc. v. HSBC Bank USA, N.A., No. 04-4209 (7th Cir. Jul. 26, 2005) rev'g HSBC Bank USA v. United Air Lines, Inc., 317 B.R. 335 (N.D. Ill. 2005) (San Francisco International Airport) and In re UAL Corp., 307 B.R. 618 (Banr. N.D. 111. 2004) affd in part by United Air Lines, Inc. v. HSBC Bank USA, 322 B.R. 347 (N.D. Ill. 2005) (Denver International Airport) and by The Bank of New York v. United Air Lines, Inc., No. 04-2838 (N.D. Ill. Feb. 16, 2005) (JFK International Airport)) have held that a "package ground lease," as utilized at the Denver airport, was a true lease whereas "ground lease/lease assignment/subleaseback" architectures of the type described above were merely disguised debt financings, allowing a user to remain in possession and relegating the bondholders to the status of creditors in the user's bankruptcy, rather than having the benefit of the more favorable lessor position under section 365 of the U.S. Bankruptcy Code. The two lease "ground lease/lease assignment/subleaseback model has been declared a disguised financing. On Mar. 7, 2006, the United States Supreme Court denied review of that decision, so all financings so structured will not be upheld as true leases. The Denver-style single lease model was affirmed as a true lease by the United States Court of Appeals for the Seventh Circuit on Jul. 6, 2006 and United has agreed not to appeal. The effects of these decisions is that the "ground lease/lease assignment/subleaseback" architecture will not be upheld as a true lease for purposes of Section 365 of the Bankruptcy Code in the event of a bankruptcy of an airline, but the Denver style single lease will be so upheld. This analysis of leases as to whether they are "true leases" extends by analogy to leases to healthcare companies, port, bridge and tollroad concessionaries, energy companies and educational enterprises.

This legal deficiency affects both the attractiveness and plausibility of both new single facility revenue bond financings and existing special facility revenue bond financings structured as a ground lease/lease assignment and leaseback, where an existing financing requires a new credit judgment (e.g., on a proposed refinancing of the bonds, or on replacement of an expiring credit support facility). The deficiency may be corrected by amending the leases and subleases involved.

With this business context understood, invention embodiments apply common third party equity or credit support and/or asset-backed financing techniques to issue municipal bonds, or to refinance existing municipal bonds, on a basis supported primarily by the creditworthiness of a facility as opposed to the credit of the ultimate tenant or user. Thus, in a scenario involving either the "ground lease plus loan" or "ground lease/lease assignment/subleaseback" architectures, if the revenue-producing potential of the facility may provide a superior credit risk than the business entity currently utilizing the improvements, common asset-backed financing techniques may be applied in recognition of the inherent value of the real estate and to isolate the revenue stream(s) through third party equity credit and/or use of a single purpose entity ("SPE") from a possible bankruptcy of the affected primary user or other primary users.

For affected business enterprises, this inventive architecture and its associated creative process could significantly lower the effective costs associated with financing the facility. For credit-enhancement providers on existing municipal bond financings, this inventive architecture and process could generate restructuring fees and lower or eliminate their exposure to declining credit ratings and associated insolvency issues. For bond underwriters, this architecture and process could provide an opportunity for new transactions and refinancing existing bond transactions providing meaningful benefits to airlines, energy or healthcare companies, port, rail or bridge concessionaries and energy project sponsors and their existing credit-support providers. For airports, hospitals, educational facilities, energy projects, toll roads and bridges, maritime ports and the like, this architecture and process could provide a mechanism to insulate their successful operations from potential credit exposure to the bankruptcy risks associated with primary users and sponsors. Multiple independent managers can be employed to reduce bankruptcy risks.

Figure 1:
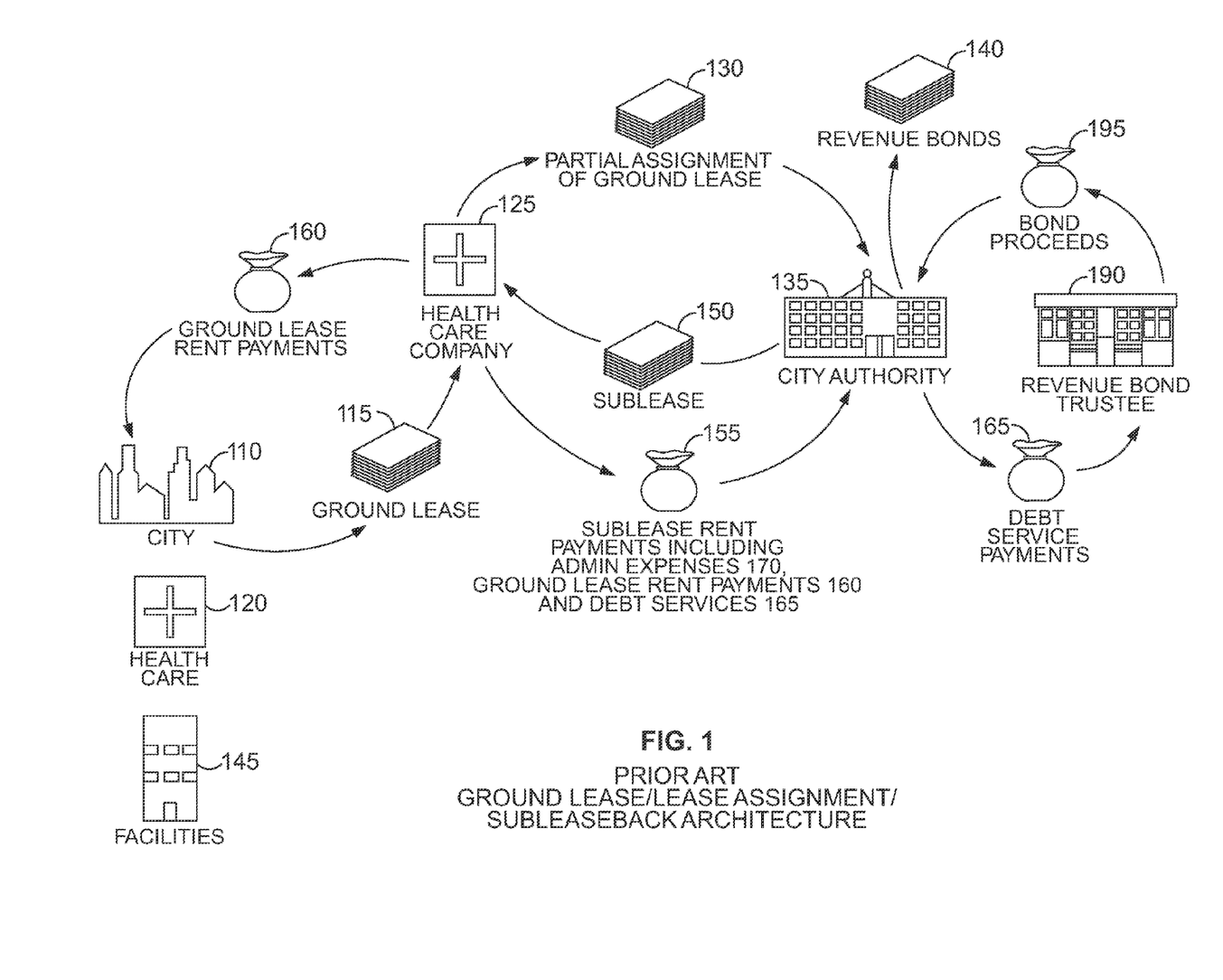
FIG. 1 illustrates an existing, conventional "ground lease/lease assignment/subleaseback" financing architecture.

A first example of a potential implementation of the above described embodiments is now provided. With reference to FIG. 1, consider an existing, conventional "ground lease/lease assignment/subleaseback" financing architecture, wherein a city 110 has entered into a ground lease 115 at healthcare facility 120 to healthcare company 125. Healthcare company 125 has partially assigned 130 the ground lease 115 to bond issuer 135 (e.g., an agency or instrumentality of city 110) for which the issuer 135 may assume a portion of the ground lease rents. Issuer 135 has issued revenue bonds 140 to finance the construction of facilities 145, e.g., improvements at a terminal at the airport 120. Issuer 135 has used the bond proceeds 195 to construct the facilities 145, and has then subleased 150 the assigned ground lease 130 and the associated improvements built thereon to health care company 125 in exchange for the undertaking of health care company 125 to pay sublease rent payments 155 equal in aggregate amount to a portion of the related ground lease rent payments 160 (if any), the debt service 165 on the bonds 140, and administrative expenses 170 relating to the bonds 140. After application to pay related ground lease rents 160, the balance of such sublease rents 155 is provided to the revenue bond trustee 190 to pay administrative expenses 170 and the debt service on the bonds 140. Debt service payments 165 are directed to the revenue bond trustee to be disbursed to bond holders.

In accordance with at least one embodiment of the invention, healthcare company 125 might undertake restructuring transactions as described with reference to FIG. 2. As illustrated in that figure, at 205, the healthcare company may contact with third parties to provide substitute credit through creation of a third party owned SPE or (as illustrated) one healthcare company itself could form an SPE and elect to treat that SPE as a "disregarded entity" for federal income tax purposes. In the latter circumstance illustrated at 210, the healthcare company shall cause the SPE formation documents to include customary and standard rating agency required provisions for maintaining "separateness" from the healthcare company appropriate for bankruptcy-remote status including, for example, establishment of a board of managers including at least two "independent managers," unrelated to the healthcare company, and providing that SPE is not authorized to take certain actions (for example, to liquidate or to file in bankruptcy, to dispose of substantial assets or to amend its formation documents) without the approval of all its managers, including the independent managers, etc. (as discussed herein) Subsequently, at 215, the healthcare company may contribute the healthcare company's interest in the ground lease and in the facilities sublease to the SPE. The contributed facilities sublease interest may include the constructed facilities and the healthcare company's interests in all sub-subleases to other healthcare companies and other third parties. The healthcare company may then, at 220, cause the SPE (whether wholly owned by the healthcare company or by third parties) to assume the obligations of the ground lease, the facilities sublease, and all other sub-subleases. Subsequently, or concurrently, at 225, the healthcare company may enter into a sub-sublease of the facilities with the SPE for the healthcare company's own use of the facilities. That sub-sublease may entail, for example, the healthcare company agreeing to pay a market rent at least equal to the ground lease payments and the operating costs of the facilities, including the facilities sublease obligations of the SPE. Also, that sub-sublease would entail terms sufficient to support the creditworthiness of the arrangement and to permit the conclusion that the sub-sublease is a "true lease" for federal bankruptcy purposes. All rights and revenues of the SPE including sublease rental amounts paid by the healthcare company may then be pledged to secure the SPE's assumed sublease obligations, and thus, the bonds (and the obligations to the credit support provider, if applicable).

Figure 2:
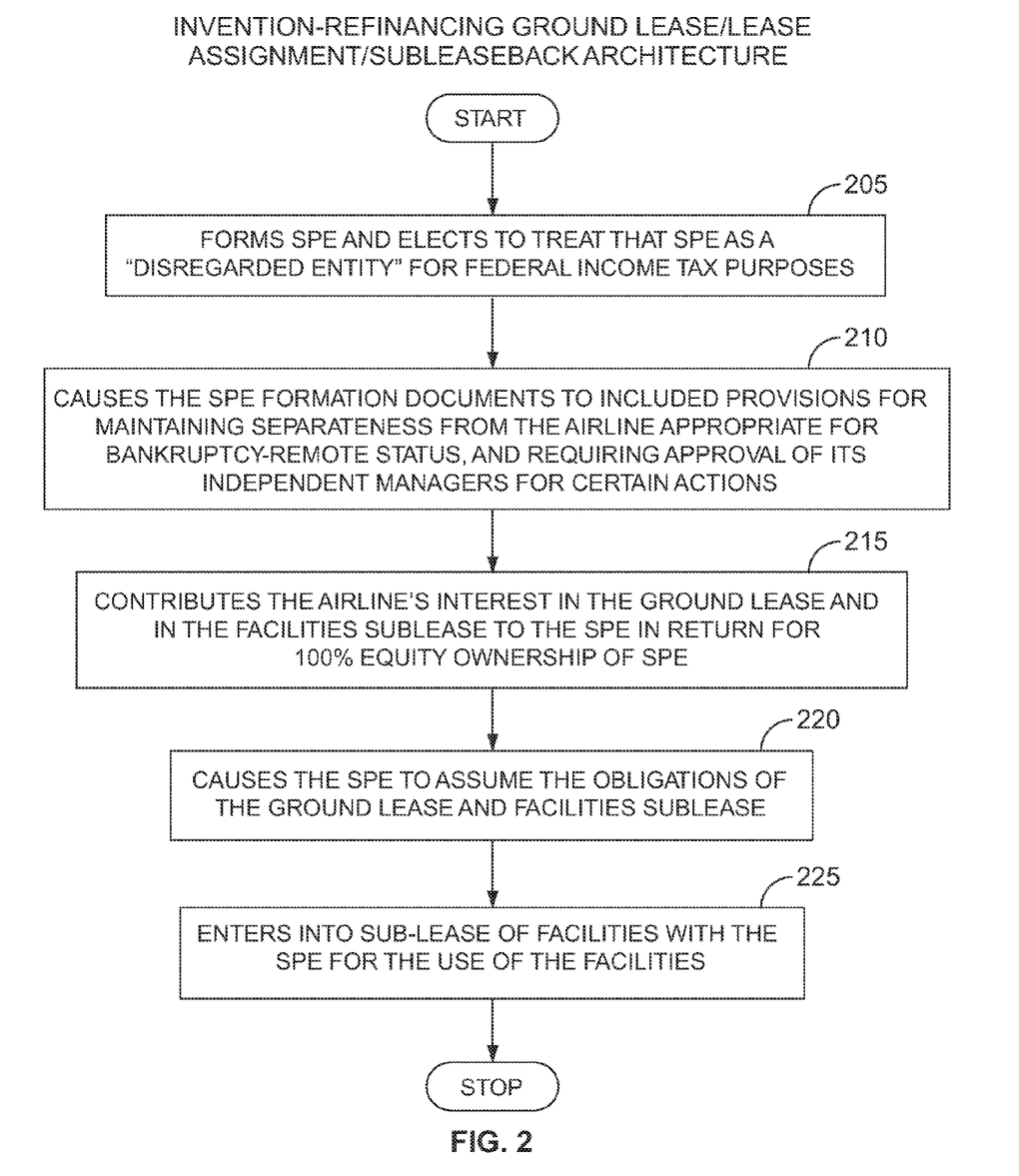
FIG. 2 illustrates various operations performed in connection with restructuring financing architectures in accordance with at least one embodiment of the invention.

It should be understood that the actions performed in FIG. 2 are merely illustrative of particular implementation options in accordance with at least one embodiment of the invention. Therefore, it is not necessary that the actions be performed in the order illustrated in FIG. 2; rather, each of those actions may be performed in various orders including simultaneously. Moreover, it should be understood that practice of the invention may not require performing all of the operations set forth in that figure or that those operations be performed specifically by the healthcare company; instead they may readily be performed by third parties. Furthermore, the illustration in FIG. 2 is presented with reference to a healthcare company and certain ground lease and facilities subleases, but the methodology has application to other entities desirous of financing an asset such as energy companies and educational institutions.

Moreover, throughout the explanation of various invention embodiments, reference is made to an SPE, which may be, for example, any business entity such as a Limited Liability Company (LLC) or a Business Trust organized in any jurisdiction that enables favorable treatments for the purposes of bankruptcy and tax (e.g., Delaware), but in each case, must be structured to conform to SPE criteria as dictated by the major U.S. rating agencies.

To establish a higher credit rating (e.g., investment grade) and, therefore markedly more favorable interest rates, the SPE may not be vulnerable to unrestricted voluntary liquidation or dissolution in the event of a bankruptcy of the healthcare company or other equity holder, or subject to substantive consolidation in a bankruptcy of the healthcare company or such third party equity owner. For the former purpose, the SPE's formation documents may provide for a managing board including at least two independent managers (who could be healthcare company representatives), to be appointed by a party other than the healthcare company or other equity holder (e.g., it could be a credit-support provider, a company providing corporate trust services, if applicable). The SPE formation documents may further provide that the SPE could not take certain actions (for example, to file in bankruptcy or undergo a voluntary liquidation or dissolution, dispose of substantial assets, or to amend its formation documents) without the approving vote of its managers, including the independent managers. This same template would apply to third party owners of such an SPE.

To avoid substantive consolidation in bankruptcy, the SPE should establish its "separateness" from the healthcare company or other equity holder based on various customary standards that have been set forth by the major rating agencies (e.g., Moody's Investors Service or Standard & Poors Corporation). These standards would be incorporated into its formation documents, which control its operation—e.g., the SPE will restrict its activities to only those necessary or incidental to its leasehold interests, management and operation of the facilities, (whether for itself or as delegated to another healthcare company or other party) and not engage in other businesses or activities, the SPE will hold itself out to the public as a legal entity separate and apart from its members or any other person, having its own assets, liabilities and operations—not constituting a branch or division of any of its members, affiliates or any other person, and not being liable for the debts of any such person.

Other such provisions dictated by the rating agencies may include the SPE undertaking (e.g., in the formation documents of the SPE) that SPE will act to (i) segregate its funds, property and other assets from those of any member or any other person and hold them in its own name, and not commingle them with those of any member or any other person; (ii) make any investments solely in its own name; (iii) not form any subsidiaries; (iv) act solely in its legal name in the conduct of its business, and conduct its business so as not to mislead others as to the identity of the entity or assets with which they are concerned; (v) keep and maintain separate records, books of account, bank accounts and financial statements; (vi) ensure that its capitalization is adequate in light of its business and purpose; (vii) not (a) guarantee, become obligated for, or otherwise hold itself out as being liable for, the debts and obligations of any member or any other person; (b) pledge its assets for the benefit of any other person; (c) make loans or advances to any person other than in the ordinary course of its business; and (d) acquire obligations or securities of any member; (viii) not enter into any transaction with any member, except upon terms and conditions that are intrinsically fair and substantially similar to those that would be available on an arms length basis with unrelated third parties. (ix) maintain an arm's-length relationship with its members and any affiliates; (x) allocate fairly and reasonably any overhead including for office space and employees shared with any member; (xi) use its own separate stationery, invoices, checks and other business forms and have its own telephone number, facsimile number and Internet domain; (xii) take commercially reasonable steps to correct any known misunderstanding regarding its separate identity; (xiii) file its own tax returns, if applicable, as may be required under applicable law; (xiv) pay its liabilities out of its own funds, including the salaries of its own employees, if any; and (xv) not engage in any dissolution, liquidation, consolidation, merger or sale of assets.

Further, in order to establish and maintain "separateness" from its equity holder parent (healthcare company or otherwise), it may be important that any sub-sublease of a portion of the facilities from the SPE back to the healthcare company or other user be on an "arms-length" basis. To avoid "disguised financing treatment," such sublease must meet the Seventh Circuit's criteria for a true lease. From an economic standpoint, an healthcare company may undertake to make payments on terms sufficient to support the creditworthiness of the arrangement and to permit the conclusion that the sub-sublease is a "true lease" for federal bankruptcy purposes.

Figure 3:
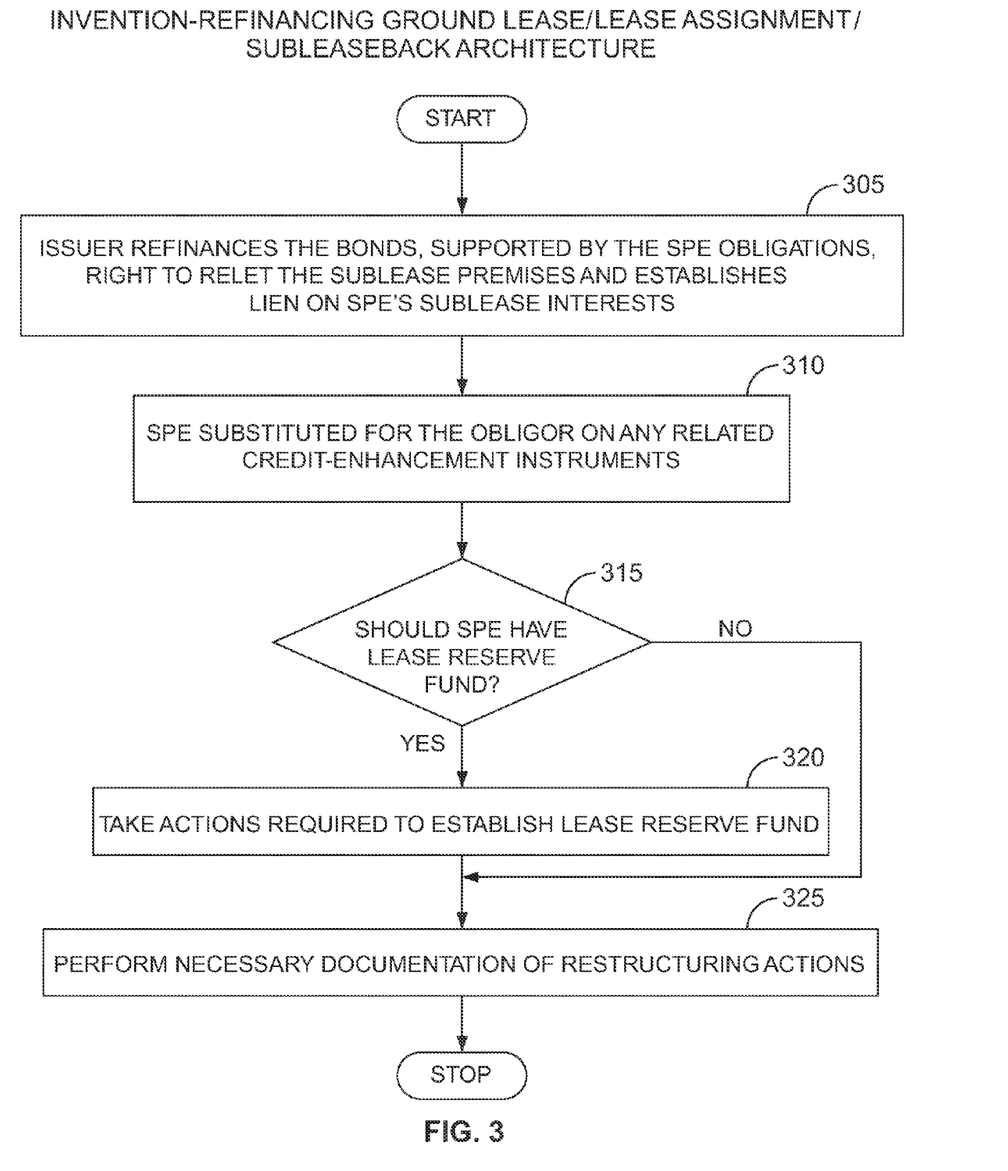
FIG. 3 illustrates various operations performed in connection with restructuring financing architectures in accordance with at least one embodiment of the invention.

Assuming that the facts would support the creditworthiness of the actions illustrated in FIG. 2, various actions may be taken, as illustrated in FIG. 3. For example, at 305, an issuer could then refinance the bonds, supported only by the SPE obligations (whether owned by the healthcare company subtenant or a third party) and the pledge of rights to leases and revenue associated with use and occupancy of the facility. Subsequently, at 310, SPE is substituted for the healthcare company on any related credit-support arrangements for the bonds. A determination may then be made, at 315, as to whether the SPE should reserve some portion of its revenues in a lease reserve fund to provide greater assurance of its ability to pay sublease rent payments on a timely basis, e.g., to cover rental payments during any relet period. If it is determined that such a fund should be created, associated actions would be performed at 320 and operations would continue at 325. That practice may, however, be subject to arbitrage yield restrictions applicable to pledged finds. For that purpose, it may be sufficient simply to debit the find to pay operating costs, if needed. If it is determined that no such lease reserve fund is necessary, the appropriate documentation of the actions performed in FIGS. 2 and 3 may be made at 325.

Again, it should be understood that the actions performed in FIG. 3 are merely illustrative of particular implementation options in accordance with at least one embodiment of the invention. Therefore, it is not necessary that the actions be performed in the order illustrated in FIG. 3; rather, each of those actions may be performed in various orders including simultaneously. Moreover, it should be understood that practice of the invention may not require performing all of the operations set forth in that figure or that those operations be performed specifically by the party identified above.

Figure 4:
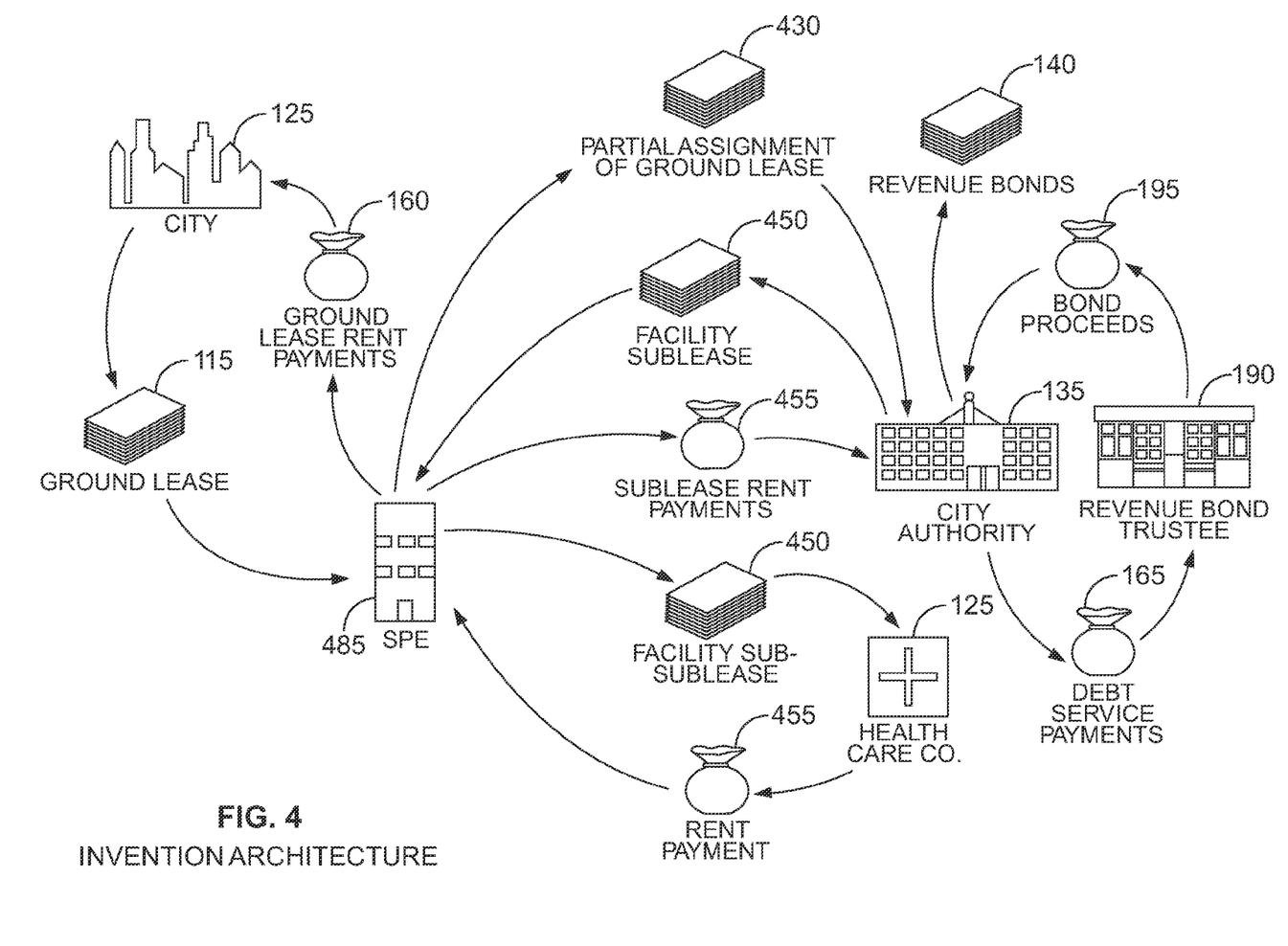
FIG. 4 illustrates a restructured financing architecture provided in accordance with at least one embodiment of the invention.

As illustrated in FIG. 4, subject to appropriate documentation, this restructured architecture might permit the bonds 140 to be refinanced on the strength of the demand for the facility and credit and resources of the SPE 485 (whether funded primarily by the healthcare company or an unrelated third party). Additionally, although the bonds 140 could be subject to the exposure of a possible bankruptcy of the SPE 485 (the risk of which should be evaluated by the rating agencies, bondholders or the credit-support provider, if applicable), the bonds 140 should be sufficiently remote from a bankruptcy of the equity holder (including, if applicable, the healthcare company) 125 as to be priced and rated on the demand for the facilities 145, and the rights and revenue and the credit of the SPE and not the healthcare company subtenant or other primary user 125.

The strength of the demand may be determined using computational means, thereby allowing for the assignment of a credit rating by a credit rating agency. The computation means includes a computer program or computer processing device electronically performing processing operations. One embodiment includes determining computer-generated credit factors associated with the financing. This determination may include the accessing, assembling, processing, collating, or any other suitable data processing/manipulation of available electronic data, such as for example demand data available from one or more electronic data repositories, as recognized by one skilled in the art. The computational means may also include electronic delivery of the credit factors determined using the processing or computational machine/device. The electronically delivery can be via any suitable means including data transmission using known or any suitable data transmission technique, but may also include physical delivery, such as data storage on a physical readable medium and the delivery consummated when the data is read from the storage medium. The delivery enables the credit rating agency to assign a credit rating thereto in accordance with known operations.

In FIG. 4, the SPE 485 has acquired the healthcare company's interest in the ground lease and in the facilities sublease. The contributed facilities sublease interest may include the constructed facilities and may also permit the SPE to sub-sublease interests to other healthcare companies and other potential users of the facilities. The SPE 485 has assumed the obligations of the facilities sublease (and the ground lease). The health care company 125 has entered into a sub-sublease of the facilities 450 with the SPE 485 for the healthcare company's own use of the facilities 145. The sub-sublease by the a healthcare company for facilities must meet the Seventh Court of Appeals' criteria of a "true lease" and may entail the healthcare company agreeing to pay a rent on terms sufficient to support the creditworthiness of the arrangement and to permit the conclusion that the sub-sublease is a "true lease" for federal bankruptcy purposes. All rights and revenues of the SPE (from whatever source) may then be pledged to secure the bonds (and the credit support provider, if applicable). To the extent permitted by the transaction documents and applicable law, the SPE could make periodic distribution of surplus revenues to its equity holders.

As a result of such a restructured architecture, there should be a corresponding reduction in the interest charges for which the SPE 485 is responsible, through its facilities sublease debt service payments to the issuer 130. Alternatively, if the bonds 140 are supported by a letter of credit, bond insurance or other credit support, this restructured architecture should result in a substantial reduction in the charges of the credit-support provider.

Figure 5:
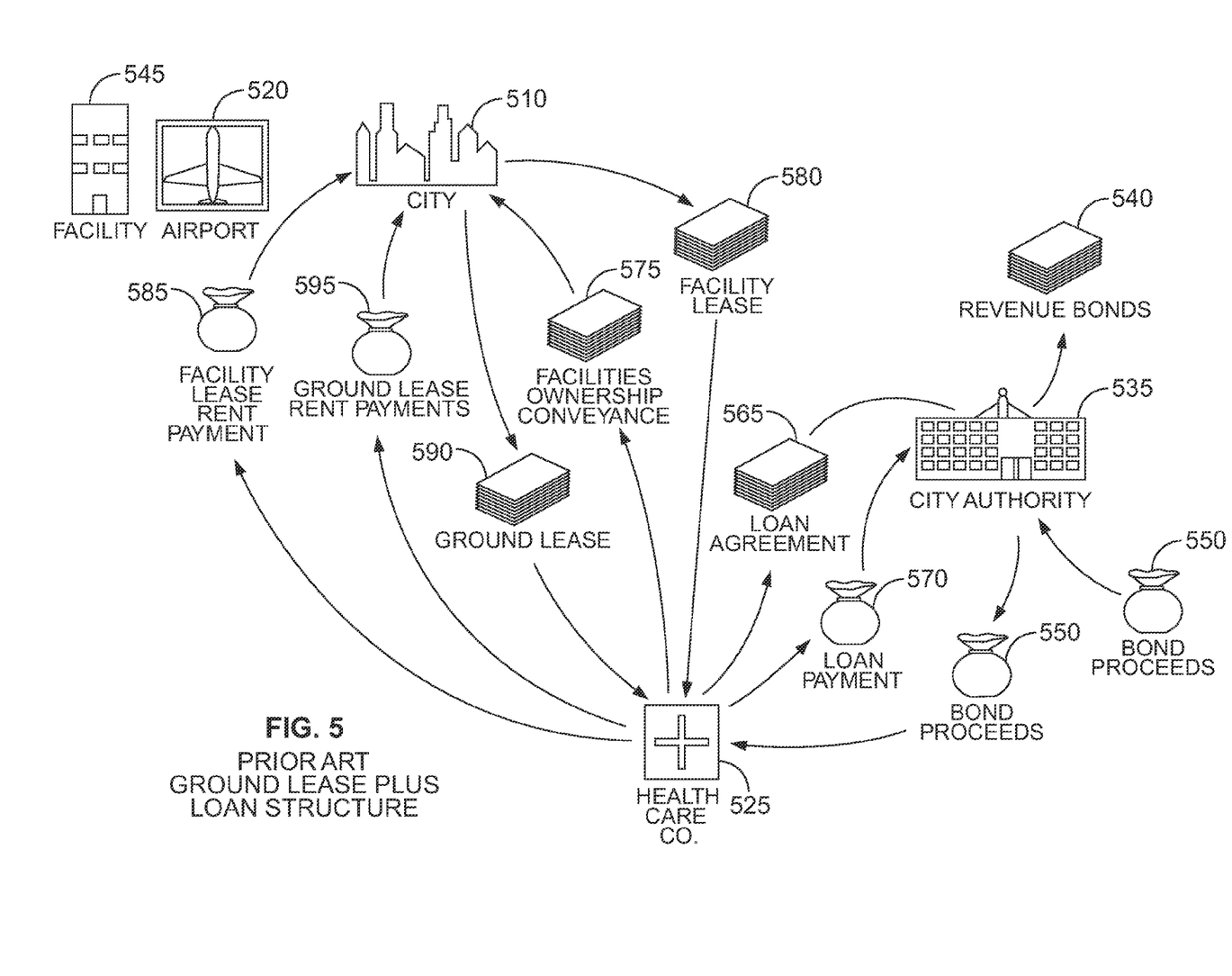
FIG. 5 illustrates an existing, conventional "ground lease plus loan" financing architecture.

A second example is provided regarding how at least one embodiment of the invention may be used to restructure a conventional "ground lease plus loan" architecture. With reference to FIG. 5, consider an existing, conventional "ground lease plus loan" financing architecture 500, wherein city 510 has entered into a ground lease 590 520 to healthcare company 525 in return for ground lease rent payments 595; a municipal authority 535 undertakes to issue revenue bonds 540 to finance the construction of the facilities 545, with the bond proceeds 550 loaned to healthcare company 525 under a loan agreement 565.

For federal income tax reasons, healthcare company 525 must elect to forego tax depreciation deductions for the facilities 545. As a result, a second loop arrangement is included in the architecture. The healthcare company 525 conveys ownership 575 of the facilities 545 to the city 510. In return, the healthcare company 525 takes back a facilities lease 580 (in return also for facilities lease rent payments 585), with a term equal to the term of the bonds 540. The rent payments 585 under the facilities lease 580 include basic rent and additional rent. Basic rent is considered prepaid by the facilities conveyance to be applied ratably over the term of the facilities lease. Additional rent is equal to annual property taxes and other annual airport charges, and costs.

It is possible that the loan agreement 565 to healthcare company 525 may be unsecured. Alternatively, the loan obligation of healthcare company 525 to the bond issuer may be secured by a pledge of its facilities lease 580 interest (e.g., a "leasehold mortgage"). In this architecture, the ground lease interest of the healthcare company 525 may not need to be pledged. The ground lease payments 595 may be fairly modest. In some cases, the ground lease 590 may include a cross-default provision, under which a default of healthcare company 525 under its loan agreement 565 with the municipal authority 530 is automatically an event of default under its ground lease 590 even if payments under that agreement are current.

In the event of a bankruptcy of healthcare company 525, this architecture is likely to suffer unacceptable events. In particular, if the healthcare company 525 files in bankruptcy and ceases making payments under loan agreement 565, the bond trustee would be delayed from foreclosing on any leasehold mortgage interest in the facilities lease 580 by the "automatic stay" rules. Thus, even though the municipal authority 535 would be a secured creditor in healthcare company's 525 bankruptcy, it would be unable to compel a sale of the facilities lease interest to other potential users of the facilities 545. The authority 535 might eventually receive some restructured monetary amount in settlement of its loan claim, on the resolution of healthcare company's 525 bankruptcy proceeding; the healthcare company's 525 possessory leasehold interests might then be sold off to another company, which might assume such rights on payment of some amounts in respect of unpaid ground lease rents and facilities lease rents.

Additionally, if the healthcare company assumes the facilities lease and ground lease 580, 590 and continues to make the annual payments 585, 595 required thereunder, there would be no basis on that account for the municipality 510 to evict the healthcare company 525 and make the facilities 545 available to some other solvent party (which could also assume the loan payment obligations 570). Further, it is questionable whether an automatic cross-default provision in the facilities lease or the ground lease 580, 590 (if it were triggered by a default under the healthcare company's loan agreement 565 based solely on the healthcare company's bankruptcy) would be enforceable. It may be that the cross-default provision would be a violation of the "ipso facto" rule, and therefore unenforceable, or would be subject to the "automatic stay" provisions of the bankruptcy law.

If a healthcare company 525 files in bankruptcy, and stops performing its obligations under the loan agreement 565 (resulting, after the exhaustion of any operating cost or debt service reserves, in a default in payments on the bonds 540 of the authority 530), it may, in some instances, at the same time retain its possession and use of the financed facilities 545. This would suspend any recovery rights of the bondholders (pending the eventual resolution of the bankruptcy proceedings), and in the meantime block the exercise by the municipality 510 or the bond trustee (e.g., the authority 535) of any right to dispossess the healthcare company 525 and make the facilities 545 available to other companies that might be willing and able to pay for usage rights to the facilities 545 in amounts sufficient to provide for current payments of debt service on the bonds 540.

In accordance with at least one embodiment of the invention wherein the healthcare company is the equity owner of the SPE as opposed to a third party, healthcare company 525 might undertake restructuring transactions as described with reference to FIG. 6. As illustrated in that figure, at 605, the healthcare company may form an SPE of which it is a member, and in some situations, be its only member. Subsequently, at 610, the healthcare company would then assign to the newly created SPE, its rights under the ground lease and the facilities lease (including its rights to any rent prepayment credits thereunder, and any existing sublease agreements it might have with other healthcare companies or other parties); the SPE would then assume all of the obligations under these agreements and the loan agreement at 615. Next, at 620, the SPE would enter into a sub-sublease agreement with the healthcare company, covering the healthcare company's usage of the facilities.

The sub-sublease rent from the healthcare company would be on terms sufficient to support the creditworthiness of the arrangement and to permit the conclusion that the sub-sublease is a "true lease" for federal bankruptcy purposes. Subject to the transaction documents and applicable law, the healthcare company would be entitled to periodic distributions of surplus revenue from the SPE.

At 625, the formation documents of the SPE would be drafted to include provisions for at least two independent managers (appointed by the bond trustee, a credit support provider, if applicable, or a named neutral party, e.g., a trust company), and would include provisions precluding the SPE from taking certain actions including a voluntary filing in bankruptcy or a dissolution or liquidation, disposing of substantial assets, or amending its formation documents without the affirmative approval of the independent managers. Those formation documents may also include a requirement that the SPE maintain compliance with various customary standard "separateness" and other characteristics promulgated by the major rating agencies from time to time.

Figure 6:
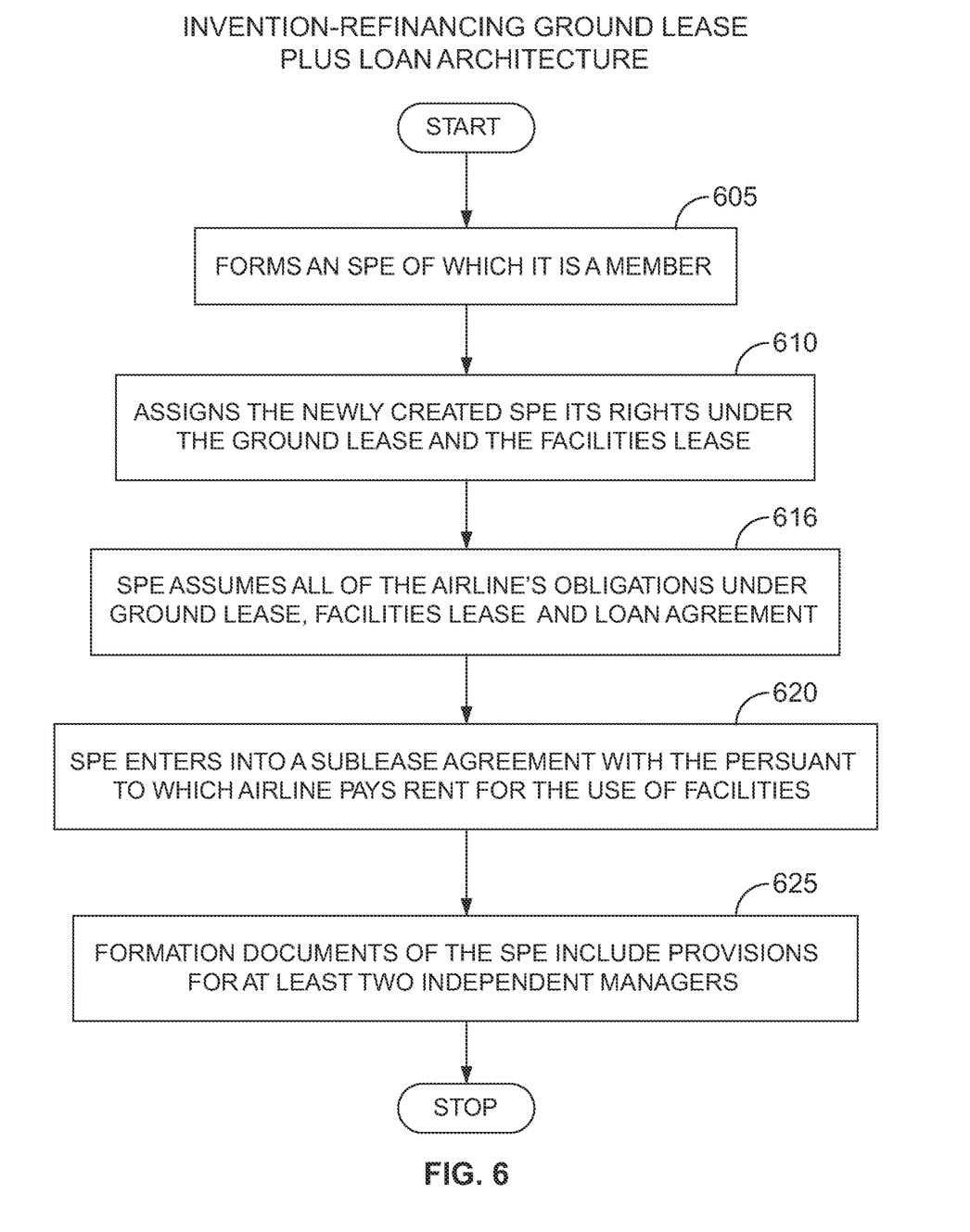
FIG. 6 illustrates various operations performed in connection with restructuring financing architectures in accordance with at least one embodiment of the invention.

Again, it should be understood that the actions performed in FIG. 6 are merely illustrative of particular implementation options in accordance with at least one embodiment of the invention. Therefore, it is not necessary that the actions be performed in the order illustrated in FIG. 6; rather, each of those actions may be performed in various orders including simultaneously. Moreover, it should be understood that practice of the invention may not require performing all of the operations set forth in that figure or that those operations be performed specifically by the party identified above but could be performed by a third party owner of the SPE.

Figure 7:
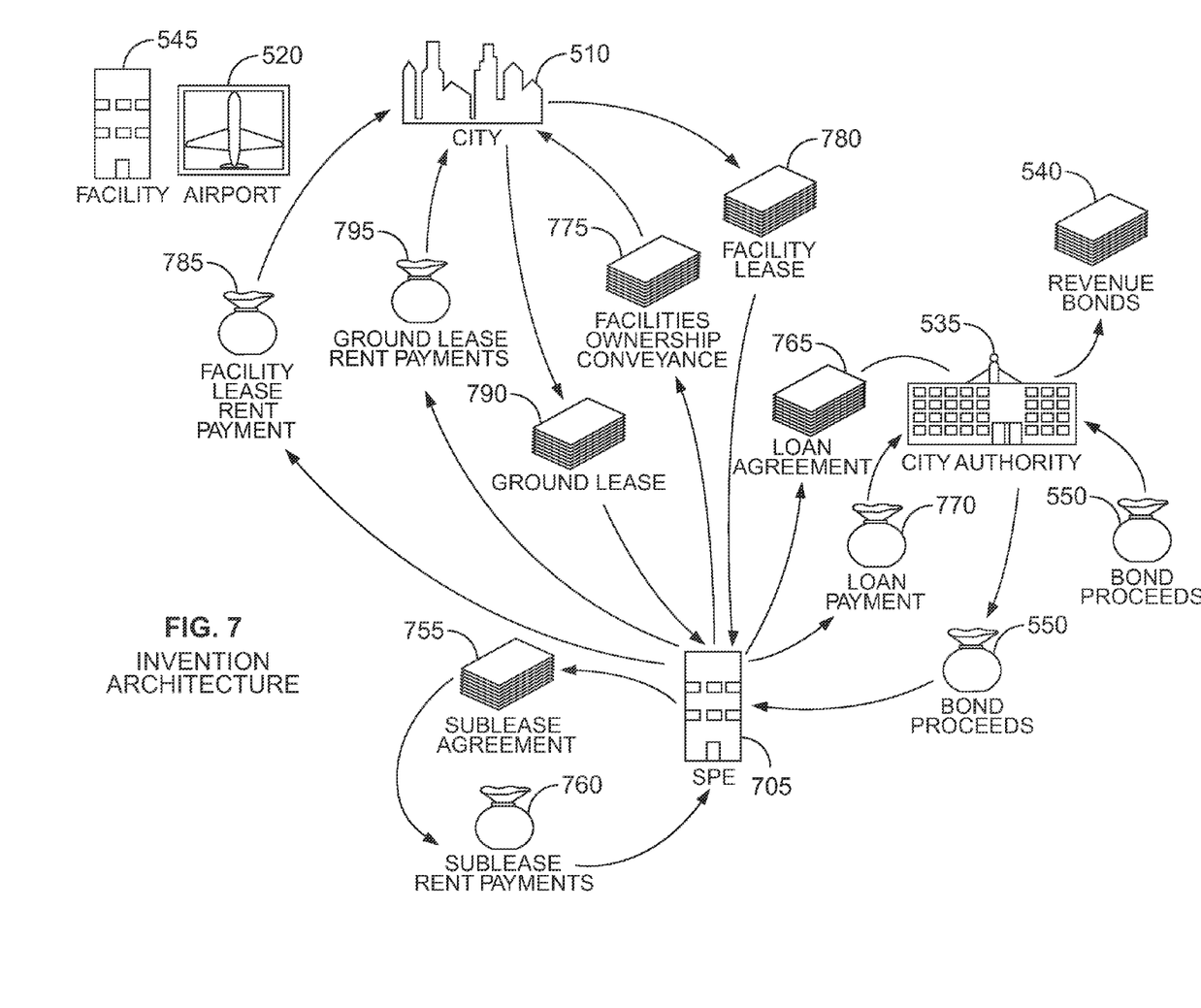
FIG. 7 illustrates a restructured financing architecture provided in accordance with at least one embodiment of the invention.

As illustrated in FIG. 7, subject to appropriate documentation, this restructured architecture might permit the bonds 540 to be refinanced on the strength of the demand for the facility leased, revenues of the facility and projected credit of the SPE 705. The healthcare company 525 is a member, and may be, in some situations, the only member of the SPE 705. The rights under the ground lease and the facilities lease are assigned to the SPE 705 by the healthcare company 525. The SPE 705 assumes all of the healthcare company's obligations under the ground lease 790, the facilities lease 780 and the loan agreement 765. The SPE 705 enters into a sublease agreement meeting the requirements of a "true lease" 755 with the healthcare company 525, covering the healthcare company's usage of the facilities (in return for sublease rent payments 760). The SPE may pledge 715 all of its rights and revenues under this sublease and other sources to secure its assumed obligations under the loan agreement 565 (and the SPE's obligation to the credit support provider, if applicable).

The sublease rent payments 760 from healthcare company 525 plus any revenues derived by the SPE 705 with respect to the facilities 545 from other sources include amounts sufficient, in the aggregate, to cover the SPE's cost of operation of the facilities, including any administrative expenses, the SPE's continuing obligations under the ground lease 790 and facilities lease 780 and the SPE's assumed obligations under the loan agreement 765. The SPE may pledge 715 all of its rights and revenues to secure its obligations under the loan agreement 565 (and the SPE's obligations to the credit support provider, if applicable).

The formation documents of the SPE 705 may include provisions for at least two independent managers as required by the major rating agencies (appointed by, e.g., the host airport, the bond trustee, a credit support provider, if applicable, or a named neutral party, e.g., a trust company), and provisions precluding the SPE 705 from taking certain actions (including a voluntary filing in bankruptcy or a dissolution or liquidation, disposition of substantial assets, or amendment of its formation documents), without the affirmative approval of the independent managers. The formation documents may also include a requirement that the SPE 705 maintain compliance with customary standard rating agency mandated "separateness" and other characteristics then required by the major rating agencies.

Assuming compliance with the "separateness" provisions, this restructured architecture should warrant a conclusion that the SPE 705 would be restricted from filing bankruptcy itself without the approval of its independent managers and "remote" from any substantive consolidation risk in a bankruptcy of the healthcare company 525. In addition, the SPE 705 could not be dissolved and liquidated into bankruptcy without the approval of its independent managers. As a result, in the event of a bankruptcy of healthcare company 525, and a default in payment of the healthcare company's sublease rent obligations, the SPE 705 (at the direction of its independent managers, the authority, the bond trustee, or any credit-support provider for the bonds, if applicable, as specified in the SPE's formation documents) should be entitled to demand that the healthcare company 525 assume and perform its sublease 755 obligations to the SPE 705 in accordance with the applicable provisions of the U.S. Bankruptcy Code, or reject the sublease 755 and relinquish rights (e.g., possession) under the ground lease 790 and the facilities lease 780 in favor of the SPE 705. In the latter case, the SPE 705 should then be in a position to make the ground lease 790 and facilities lease 780 available to other healthcare companies, on a basis that may enable the SPE 705 to continue making payments under the assumed loan agreement 765.

Additionally, the debt documents will obligate the SPE to enforce its rights against the lessee. And, if the SPE 705 fails for some reason to enforce these rights, and the SPE's assumed obligations under the loan agreement 765 are supported by leasehold mortgages on the SPE's interest in the ground lease 790 and facilities lease 780, the bond trustee should be able to foreclose on such mortgages because the SPE is not in bankruptcy, free of any "automatic stay" restrictions imposed by the bankruptcy of the healthcare company 525, and either sell the leasehold interests or re-sublease the ground and facilities to other healthcare companies and users on a potentially profitable basis, for the benefit of the bondholders.

It should be understood that various embodiments of the invention enable the structuring of a financing architecture for new money as well as the restructuring of an existing financing architecture. Thus, the structuring of a new financing architecture such as those illustrated in FIGS. 4 and 7 or the like, is described.

In accordance with at least one embodiment of the invention, a healthcare company and other interested parties might also undertake structured financing for new money in such a way as to provide a financing architecture that corresponds to a conventional "ground lease/lease assignment/sublease-back" financing architecture (see, e.g., architecture 100 in FIG. 1) but with the benefits associated with providing a bankruptcy-remote organization responsible for issued revenue bonds. For example, such actions may be performed as illustrated with reference to FIG. 8. As illustrated in that figure, at 805, an SPE may be formed and be treated as a "disregarded entity" by the healthcare company or other equity holder for federal income tax purposes. Subsequently, at 810, the SPE's formation documents shall include provisions mandated by the major rating agencies, including without limitations, provisions maintaining "separateness" from the healthcare company or other equity holder appropriate for bankruptcy-remote status, and preventing certain actions from being taken without the approval of its independent managers (as explained above). Subsequently, at 815, the SPE enters into a ground lease and a facilities sublease, with the relevant parties (e.g., the city, any private operating company and/or municipal authority). Then, at 820, the healthcare company may enter into a sub-sublease of the facilities meeting the requirements of a "true lease" with the SPE for the healthcare company's own use of the facilities. At 825, the SPE also enters into sub-subleases of the facilities with other healthcare companies and other interested parties as well. Those sub-subleases meeting the requirements of a "true lease" may entail, for example, the healthcare company and other interested parties agreeing to pay a rent sufficient to support the creditworthiness of the arrangement and to permit the conclusion that the sub-sublease is a "true lease" for federal bankruptcy purposes. Then, at 830, all rights and revenues of the SPE may be pledged to secure its lease obligations supporting the bonds (and the obligations to the credit support provider, if applicable).

Figure 8:
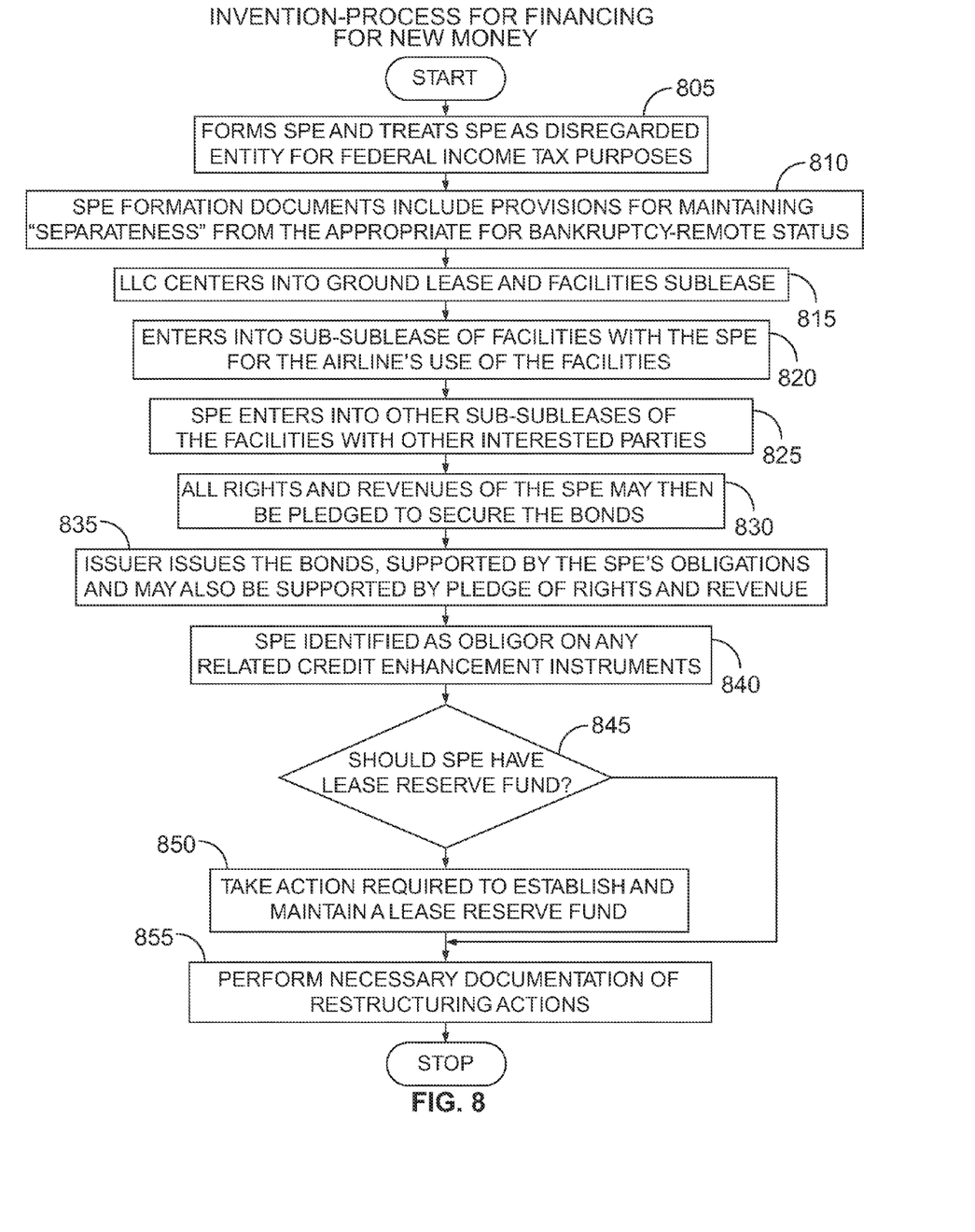
FIG. 8 illustrates various operations performed in connection with structuring of financing architectures in accordance with at least one embodiment of the invention.

Subsequently, at 835, an issuer issues the bonds, supported only by the SPE obligations. The SPE may then, at 840, be identified as solely responsible on any related credit-support arrangements for the bonds.

A determination may then be made, at 845, as to whether the SPE should reserve some portion of its revenues in a lease reserve fund to provide greater assurance of its ability to pay sublease rent payments on a timely basis, e.g., create a lease reserve fund to cover rental payments during any relet period. If it is determined that such a fund should be created, associated actions would be performed at 850 and continue to be performed at 855. That practice may, however, be subject to arbitrage yield restrictions applicable to pledged funds. If it was determined that no such fund is necessary, the appropriate documentation of the actions performed in FIG. 8 would be made at 855. As a result, of such actions, a financing architecture may be provided as illustrated in FIG. 4.

It should be understood that the actions performed in FIG. 8 are merely illustrative of particular implementation options in accordance with at least one embodiment of the invention. Therefore, it is not necessary that the actions be performed in the order illustrated in FIG. 8; rather, each of those actions may be performed in various orders including simultaneously. Moreover, it is not necessary that the SPE be owned in whole or in part by the healthcare company or that it be organized in a particular jurisdiction. Moreover, it should be understood that practice of the invention may not require performing all of the operations set forth in that figure or that those operations be performed specifically by the party identified above.

Similarly, in accordance with at least one embodiment of the invention, a healthcare company, third party equity holder and other interested parties might undertake structuring financing transactions in such a way as to provide a financing architecture that corresponds to a conventional "ground lease plus loan" financing architecture (see, e.g., architecture in FIG. 5) but with the benefits associated with providing for a bankruptcy-remote organization to be the ground lessee and the borrower under the loan agreement responsible for repayment of the revenue bonds. For example, such actions may be performed towards such an end as illustrated with reference to FIG. 9. As illustrated in that figure, at 905, an SPE is formed of which the healthcare company may be the only member (but could have several members or one member unrelated to the healthcare company). Subsequently, at 910, the SPE enters into the ground lease, facilities lease and loan agreement with the appropriate parties (e.g., city and/or city authority). The leases may include rights to any rent prepayment credits thereunder.

Figure 9:
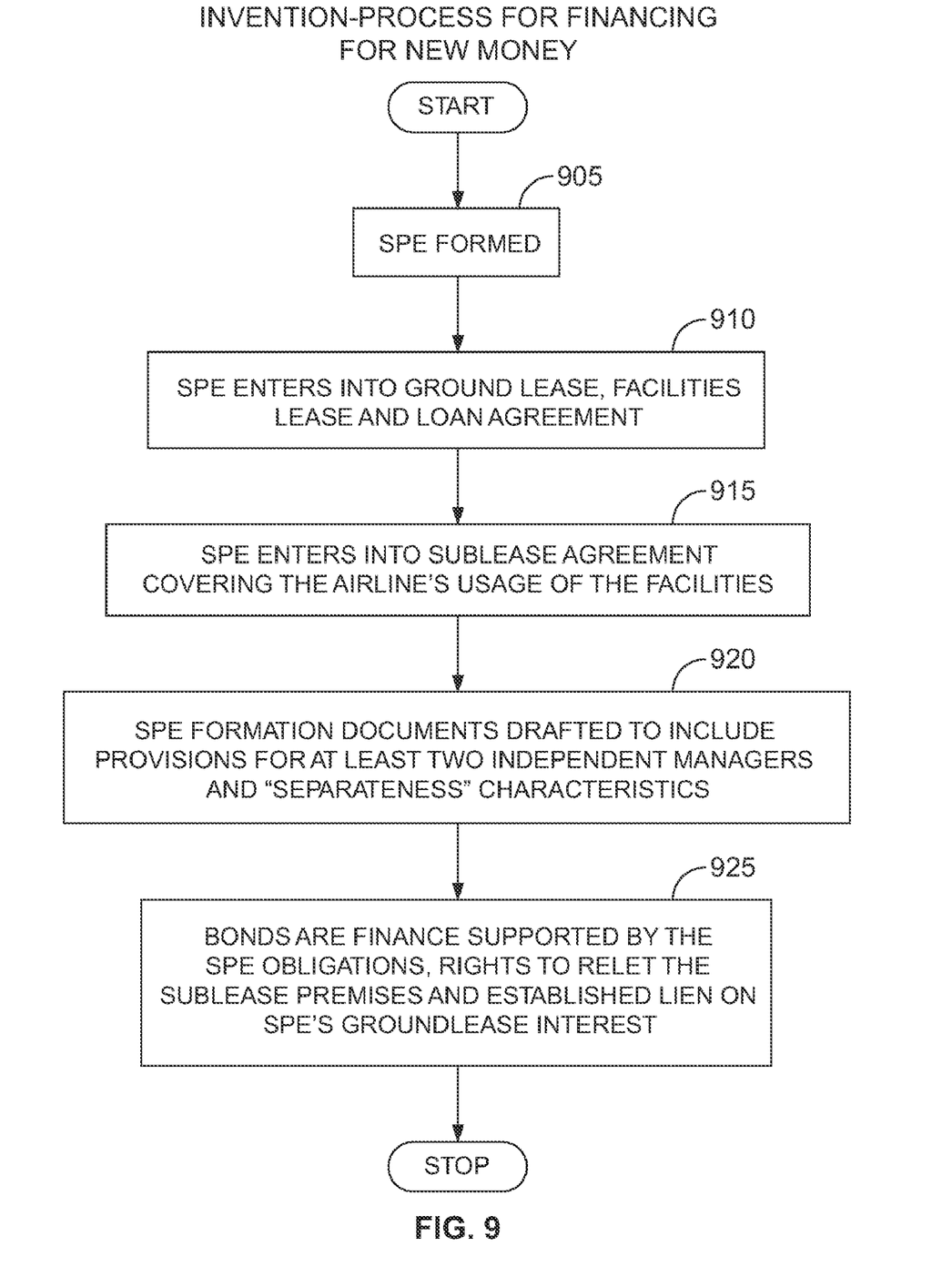
FIG. 9 illustrates various operations performed in connection with structuring of financing architectures in accordance with at least one embodiment of the invention.

At 915, the SPE enters into a sublease agreement with the healthcare company, covering the healthcare company's usage of the facilities. The sublease rent from the healthcare company together with any revenues derived by the SPE with respect to the facilities from other sources, including other sublease rental income from other healthcare companies and other service parties (e.g., concessionaires, etc.) would, in the aggregate, be on terms sufficient to support the creditworthiness of the arrangement and to permit the conclusion that the sub-sublease is a "true lease" for federal bankruptcy purposes.

At 920, the formation documents of the SPE are drafted to include provisions for at least two independent managers or other number as required by the major rating agencies rating the new or restricted debt (appointed by the host airport, bond trustee, a credit support provider, if applicable, or a third party, e.g., a trust company), and include provisions precluding the SPE from taking certain actions (including a voluntary filing in bankruptcy or a dissolution or liquidation, a disposition of substantial assets, or an amendment to its formation documents) without the affirmative approval of the independent managers. The formation documents may also include a requirement that the SPE maintain compliance with various, customary standard "separateness" characteristics (as explained above). At 925, the bonds are financed on the strength of the credit of the SPE.

As a result, of such actions, a financing architecture may be provided as illustrated in FIG. 7, or the like.

Again it should be understood that the actions performed in FIG. 9 are merely illustrative of particular implementation options in accordance with at least one embodiment of the invention. Therefore, it is not necessary that the actions be performed in the order illustrated in FIG. 9; rather, each of those actions may be performed in various orders including simultaneously. Moreover, it should be understood that practice of the invention may not require performing all of the operations set forth in that figure or by the party identified above.

As alluded to above, it should be understood that various embodiments of the invention have been disclosed herein and interrelated issues and factors are worth consideration by one of ordinary skill. For example, the same principle and structure is applicable to an education institution. Another application of the present principle and structure is an energy project, such as a cogeneration facility, windfarm facility, improvements to oil refineries or any other suitable type of energy production facility as recognized by one skilled in the art.

From a tax standpoint, there may be a number of federal income tax issues relevant to structuring or restructuring performed in accordance with embodiments of the invention. Potential issues seem to arise in three areas: (1) consequences of the structured/restructured transaction; (2) consequences of operations under the resulting financing architecture; and (3) implications for an existing or new tax-exempt or taxable bond financing of the facilities.

An assignment of the rights of the healthcare company under the ground lease and facilities sublease to the SPE should have no federal income tax effect, because the SPE is meant to be treated in effect as a mere branch of the healthcare company (if the healthcare company is the only member), or a partnership (if two or more healthcare companies are members) for federal income tax purposes. As a result, the assignments should not be treated as a taxable transaction. Tax treatment will differ if the SPE is not owned by the healthcare company transferor.

There may be some instances in which the facilities are presently jointly-operated by two or more healthcare companies, either as a joint venture or through some common legal entity. In such a situation, in accordance with at least one embodiment of the invention, contributing existing rights to a conduit SPE, or contributing interests in an ownership entity to one or more SPEs may achieve the federal income tax effect noted above.

In the case of a single-member SPE, if the SPE is a "disregarded entity" of the healthcare company, its operations, revenue and expenses should have no different federal income tax effect to the healthcare company as a result of the restructure architecture, even if the contractual arrangements between the entities involve a sub-sublease payment obligation from the healthcare company to the SPE. However, if multiple healthcare companies are the sponsoring parties, further analysis would be required to determine the effects of restructuring the financing architecture as described above; nevertheless, the potential for partnership treatment of an interposed SPE (or for interposed SPEs of each participating healthcare company) is possible under federal income tax regulations.

In the case of the structuring of a financing architecture for new money, it does not appear that methods and architectures designed in accordance with the invention would involve any significantly different tax-exempt financing considerations than a financing for the direct benefit of the healthcare company. However, when an existing, outstanding tax-exempt issue is involved, other considerations may be relevant. In particular, the form of a restructured architecture designed in accordance with at least one embodiment of the invention will involve a refunding of any existing outstanding bonds.

In general, if the existing bonds were issued after 1986, the refunding may not present any new or different federal income tax issues for tax-exempt purposes.

If, however, the existing bonds were issued before the effective date of the 1986 Tax Reform Act, there may be a question whether the refunding bonds qualify under transition rules of the 1986 Act, without regard to the new standards for facilities financings that were first imposed by that Act. This conclusion might be more easily reached if the SPE is a single-member entity of the healthcare company, rather than a common entity of more than one healthcare company; however, if any change occurs through the interposition of entities above that level, there may be no basis for a distinction.

On the other hand, if the refunding of a pre-1986 bond issue would not be eligible for transition-rule protection, evaluation may need to be performed by bond counsel in light of the changes that have since occurred.

Beyond these tax implications, there may be additional issues posed by the structuring or restructuring of a financing architecture and associated processes. In particular, for example, if a restructured financing architecture requires some accumulation of revenues or third party equity contributions at the level of the SPE, for the better assurance of the credit of the bonds (or the credit-support provider, if applicable), care may need to be exercised to assure either that such funds do not constitute "replacement proceeds" of the bonds, subject to an investment yield limitation not greater than the yield of the bonds, or that they comply with such limitations. It is possible that such limitations could be avoided by providing that any such accumulated funds are not pledged for payment of sublease rent, and are at all times subject to debit, if necessary, to pay operating costs of the SPE. If depressed yields are available for temporary investments, this may not be a practical problem, but a method of assuring compliance may need to be considered.

In addition, and wholly apart from the above, any particular restructuring along the lines herein disclosed may require evaluation of relevant state or local income or other tax issues.

Further, it should be understood that the effect of structuring or restructuring financing architectures in accordance with various embodiments of the invention depends, in each case, on the potential strong demand for use of the facilities by others. Thus, the structuring or restructuring of financing architectures cannot guarantee a successful result without the requisite third party demand for use of the facilities.

Nevertheless, the financing processes and architectures provided in accordance with embodiments of the invention may effectively prevent a ground lease and a facilities lease from being frozen in a possible bankruptcy of a healthcare company, while associated bonds are in default.

While the embodiments of the present invention may have been explained with regard to particular examples of implementation of various embodiments of the invention, it should be understood that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

For example, although implementations of particular embodiments of the invention have been described in connection with a single healthcare company, it should be understood that the invention may be practiced in connection with the financing or refinancing of facilities for more than one healthcare company, for example, a group or consortium of healthcare companies, or may be applied in a financing or refinancing of a maritime cargo and/or passenger terminal or berth, toll bridges or toll roads, train depots, educational facilities or energy projects with demonstrable demand for use of such facilities.

It is also noted that the present invention is applicable for performed or executed in a computing environment, for example the computing of a credit rating for the financing as noted above. The loan and bond financing structure can be implemented in a computer-implemented environment including processing operations performed by a computer-processing device. For example, a physical processor may performed computational processing operations in response to executable code physically stored in a computer readable medium.

FIGS. 1-9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A process for obtaining financing, the process comprising:

forming a single-purpose business entity (SPE), with at least one operating requirement that establishes separateness of the single-purpose business entity from one or more separate business entities;
transferring the one or more separate business entities facility or equipment lease obligations to the single-purpose entity;
assigning rights to revenues of the facility or equipment to the single-purpose entity;
forming a lessee or loan relationship with the single-purpose entity wherein one or more third parties pay the revenues to the SPE;
determining, in a programmed machine, computer-generated credit factors for the financing;
electronically delivering the credit factors to a credit rating agency, such that the credit rating agency assigns a credit rating for the financing, based on the credit factors and the revenues of the SPE, the assigned credit rating being superior to a credit rating available to the one or more business entities using the facilities or equipment;
securing bond financing for the facility or equipment on a basis of the assigned credit rating including issuing bonds with a rating established at least in part in view of a demand for such facility or equipment; and
allocating the bond financing for purchase, construction or renovation of an education institution.

2. The process of claim 1, including the additional steps of treating the single purpose business entity as a disregarded entity if there is only one separate business entity and treating the single-purpose business entity as a partnership if there is more than one separate business entity.

3. The process of claim 1, wherein there are existing bonds for the facility or equipment and wherein the step of securing bond financing includes refunding the existing municipal bonds with a rating established at least in part in view of the demand for such facility or equipment.

4. The process of claim 1, wherein the transferring, assigning, forming and securing steps restructure financing architecture concerning one of a ground lease, a lease assignment, and a subleaseback.

5. The process of claim 1, wherein the transferring, assigning, forming and securing steps restructure financing architecture concerns a ground lease plus loan architecture.

6. The process of claim 1, wherein the forming step having the at least one operating requirement that establishes separateness of the single-purpose business entity from the one or more separate business entities comprises establishing a board of managers including at least two independent managers unrelated to the one or more separate business entities.

7. The process of claim 1, wherein the bond financing is for at least one of: a municipal bond issue or a private refunding.

8. A process for obtaining financing, the process comprising:
forming a single-purpose business entity (SPE), with at least one operating requirement that establishes separateness of the single-purpose business entity from one or more separate business entities;
transferring the one or more separate business entities facility or equipment lease obligations to the single-purpose entity;
assigning rights to revenues of the facility or equipment to the single-purpose entity;
forming a lessee relationship with the single-purpose entity wherein one or more third parties pay the revenues to the SPE;
determining, in a programmed machine, computer-generated credit factors for the financing;
electronically delivering the credit factors to a credit rating agency, such that the credit rating agency assigns a credit rating for the financing, based on the credit factors and the revenues of the SPE, the assigned credit rating being superior to a credit rating available to the one or more business entities using the facilities or equipment;
securing bond financing for the facility or equipment on a basis of the assigned credit rating including issuing bonds with a rating established at least in part in view a demand for such facility or equipment; and
allocating the bond financing for purchase, construction or renovation of a health care facility.

9. The process of claim 8, including the additional steps of treating the single-purpose business entity as a disregarded entity if there is only one separate business entity and treating the single-purpose business entity as a partnership if there is more than one separate business entity.

10. The process of claim 8, wherein there are existing bonds for the facility or equipment and wherein the step of securing bond financing includes refinancing the existing bonds with a rating established at least in part in view of the demand for such facility or equipment.

11. The process of claim 8, wherein the transferring, assigning, forming and securing steps restructure financing architecture concerning one of a ground lease, a lease assignment, and a subleaseback.

12. The process of claim 8, wherein the transferring, assigning, forming and securing steps restructure financing architecture concerns a ground lease plus loan architecture.

13. The process of claim 8, wherein the forming step having the at least one operating requirement that establishes separateness of the single-purpose business entity from the one or more separate business entities comprises establishing a board of managers including at least two independent managers unrelated to the one or more separate business entities.

14. The process of claim 8, wherein the bond financing is for at least one of: a municipal bond issue or a private refunding.

15. A process for obtaining financing, the process comprising:
forming a single-purpose business entity (SPE), with at least one operating requirement that establishes separateness of the single-purpose business entity from one or more separate business entities;
transferring the one or more separate business entities facility or equipment lease obligations to the single-purpose entity;
assigning rights to revenues of the facility or equipment to the single-purpose entity;
forming a lessee relationship with the single-purpose entity wherein one or more third parties pay the revenues to the SPE;
determining, in a programmed machine, computer-generated credit factors for the financing;
electronically delivering the credit factors to a credit rating agency, such that the credit rating agency assigns a credit rating for the financing, based on the credit factors and the revenues of the SPE, the assigned credit rating being superior to a credit rating available to the one or more business entities using the facilities or equipment;
securing bond financing for the facility or equipment on a basis of the assigned credit rating including issuing bonds with a rating established at least in part in view of a demand for such facility or equipment; and
allocating the bond financing for purchase, construction or renovation of an energy production facility.

16. The process of claim 15, including the additional steps of treating the single-purpose business entity as a disregarded entity if there is only one separate business entity and treating the single-purpose business entity as a partnership if there is more than one separate business entity.

17. The process of claim 15, wherein there are existing bonds for the facility or equipment and wherein the step of securing bond financing includes refinancing the existing bonds with a rating established at least in part in view of the demand for such facility or equipment.

18. The process of claim 15, wherein the transferring, assigning, forming and securing steps restructure financing architecture concerning one of a ground lease, a lease assignment, and a subleaseback.

19. The process of claim 15, wherein the transferring, assigning, forming and securing steps restructure financing architecture concerns a ground lease plus loan architecture.

20. The process of claim 15, wherein the forming step having the at least one operating requirement that establishes separateness of the single-purpose business entity from the one or more separate business entities comprises establishing a board of managers including at least two independent managers unrelated to the one or more separate business entities.

21. The process of claim 15, wherein the bond financing is for at least one of: a municipal bond issue or a private refunding.

* * * * *